US012398871B1

(12) United States Patent
Tiet

(10) Patent No.: US 12,398,871 B1
(45) Date of Patent: Aug. 26, 2025

(54) MONITOR STAND

(71) Applicant: Felix Co Ut LLC, Diamond Bar, CA (US)

(72) Inventor: Hanh T Tiet, Diamond Bar, CA (US)

(73) Assignee: Felix Co Ut LLC, Diamond Bar, CA (US)

( * ) Notice: Subject to any disclaimer, the term of this patent is extended or adjusted under 35 U.S.C. 154(b) by 0 days.

(21) Appl. No.: 19/019,500

(22) Filed: Jan. 14, 2025

(51) Int. Cl.
*F21V 23/04* (2006.01)
*A47B 97/00* (2006.01)
*F21V 33/00* (2006.01)

(52) U.S. Cl.
CPC .......... *F21V 23/0471* (2013.01); *A47B 97/00* (2013.01); *F21V 33/0052* (2013.01); *A47B 2097/006* (2013.01); *A47B 2220/0077* (2013.01)

(58) Field of Classification Search
CPC ... F21V 23/0471; F21V 33/0052; A47B 97/00
See application file for complete search history.

(56) References Cited

U.S. PATENT DOCUMENTS

| | | | | |
|---|---|---|---|---|
| 11,474,612 | B2 * | 10/2022 | Hasburgh | E05F 15/73 |
| 12,333,209 | B2 * | 6/2025 | Reilly | G06F 3/011 |
| 2012/0092855 | A1 * | 4/2012 | Smith | A47B 81/06 211/26 |
| 2014/0265787 | A1 * | 9/2014 | Sabounjian | A47B 97/00 312/334.1 |
| 2015/0300627 | A1 * | 10/2015 | Wang | F21V 33/0012 362/127 |
| 2020/0340657 | A1 * | 10/2020 | Morariu | F21V 23/0414 |
| 2022/0136692 | A1 * | 5/2022 | Howard | A47B 37/00 362/127 |
| 2022/0343590 | A1 * | 10/2022 | Jutan | G06F 3/04847 |
| 2024/0298819 | A1 * | 9/2024 | Gerig | H05B 47/115 |

* cited by examiner

*Primary Examiner* — Bryon T Gyllstrom

(57) ABSTRACT

The monitor stand is provided and includes a base, a light emission unit, a gesture sensor, a touch sensor, and a controller. The base supports a monitor and has an interior. The light emission unit is disposed on the base and selectively emits light. The gesture sensor, the touch sensor, and the controller are disposed within the interior of the base. The gesture sensor is configured to detect a hand gesture to generate a first sensing signal. The touch sensor is configured to detect a touch motion to generate a second sensing signal. The controller controls the light emission unit to be turned on or turned off according to the first sensing signal and controls the light emission unit to change the color of the light according to the second sensing signal. By the aforementioned configuration, the seamless color changes and the dimmable illumination in the monitor stand are achieved.

22 Claims, 10 Drawing Sheets

MONITOR STAND

TECHNICAL FIELD OF THE INVENTION

The present disclosure is related to a technical field of computer accessories and is particularly directed to a monitor stand.

DESCRIPTION OF THE PRIOR ART

A monitor stand is a bracket to support a monitor (i.e., a display) and can raise the height of the monitor to help a user see images or videos of the monitor comfortably so that the user does need to see downwardly the monitor. Because the monitor stand raises the height of the monitor, the monitor can be positioned at the same level as the eyes of the user, thus preventing the problem about the neck and the back of the user.

As technology advances and evolves, computer games are common, and the user's experience on the computer games become important. Although the various types of the monitor stands have existed, the current monitor stands cannot still set the atmospheres according to the various scenarios of the computer games, and it would have a bad influence on the user's experience on the computer games.

Hence, how to set the atmosphere according to the various scenarios of the computer games is an important issue.

SUMMARY

In light of the aforementioned description, the present disclosure is to provide a monitor stand which can set the atmosphere according to the various scenarios of the computer games.

Based on the aforementioned description, the present disclosure provides a monitor stand. The monitor stand includes a base, a light emission unit, a gesture sensor, a touch sensor, and a controller. The base supports a monitor and has an interior. The light emission unit is disposed on the base and selectively emits light. The gesture sensor is disposed within the interior of the base, is configured to detect a hand gesture, and generates a first sensing signal according to the hand gesture. The touch sensor is disposed within the interior of the base, is configured to detect a touch motion, and generates a second sensing signal according to the touch motion. The controller is disposed within the interior of the base, is electrically connected to the light emission unit, the gesture sensor and the touch sensor, and controls the light emission unit to be turned on or turned off according to the first sensing signal and controls the light emission unit to change the color of the light according to the second sensing signal.

Based on the aforementioned description, the present disclosure provides a monitor stand. The monitor stand includes a base, a light emission unit, a gesture sensor, a touch sensor, and a controller. The base supports a monitor and has an interior, and the base includes an accommodation groove. The accommodation groove accommodates the dismountable wireless charger. The light emission unit is disposed on the base and selectively emits light. The gesture sensor is disposed within the interior of the base, is configured to detect a hand gesture, and generates a first sensing signal according to the hand gesture. The touch sensor is disposed within the interior of the base, is configured to detect a touch motion, and generates a second sensing signal according to the touch motion. The controller is disposed within the interior of the base, is electrically connected to the light emission unit, the gesture sensor and the touch sensor, and controls the light emission unit to be turned on or turned off according to the first sensing signal and controls the light emission unit to change the color of the light according to the second sensing signal. The dismountable wireless charger is foldable, is switched between a folded state and an unfolded state and is configured to charge a plurality of external electronic devices.

In view of the above description, the dimmable illumination in the monitor stand is achieved by the light emission unit, the gesture sensor and the controller, and the seamless color changes in the monitor stand are achieved by the light emission unit, the touch sensor, and the controller. When the monitor stand is applied to the situation that a user plays a computer game, the user makes a hand gesture in front of the gesture sensor, and the light emission unit emits the light after the gesture sensor detects the hand gesture of the user. Afterwards, the user touches the monitor stand, and the color of the light changes to match the user's gaming mood after the touch sensor detects the touch motion of the user. Hence, the monitor stand has a good influence on the user's experience on the computer games.

The aforementioned description of the present disclosure is merely the outline of the technical solutions of the present disclosure. In order to understand the technical solutions of the present disclosure clearly and to implement the present disclosure according to the content of the specification, the better embodiments of the present disclosure given herein below with accompanying drawings are used to describe the present disclosure in detail.

DETAILED DESCRIPTION

The specific embodiments of the present disclosure given herein below is used to explain the implementation of the present disclosure. A person skilled in the art easily understands the advantages and the effects of the present disclosure from the content of the present disclosure.

It should be noted that the embodiments and the features in the embodiments of the present disclosure can be combined with each other without conflict. The present disclosure will be described in detail below with reference to accompanying drawings and in conjunction with the embodiments. In order to provide those in the art with better understanding of the solution of the disclosure, the technical solutions in the embodiments of the present disclosure will be described clearly and completely below in conjunction with the accompanying drawings in the embodiments of the present disclosure. Apparently, the described embodiments are merely one part of the embodiments of the present disclosure and not all embodiments of the present disclosure. Based on the embodiments of the present disclosure, all embodiments obtained by a person skilled in the art without any inventive steps shall fall within the scope of protection of the present disclosure.

It should be noted that the terms “first”, “second”, etc. in the specification and claims of the present disclosure and in the aforementioned accompanying drawings are used to distinguish similar objects and not used to describe a particular order or sequence. Furthermore, the terms “comprising” and “having”, and any variation thereof, are intended to encompass a non-exclusive inclusion, for example, a series of steps or units comprising processes, methods, systems, products or equipment do not need to be limited to those steps or units clearly listed but may include other steps or units not clearly listed or inherent to those processes, methods, products or equipment.

Figure 1A:
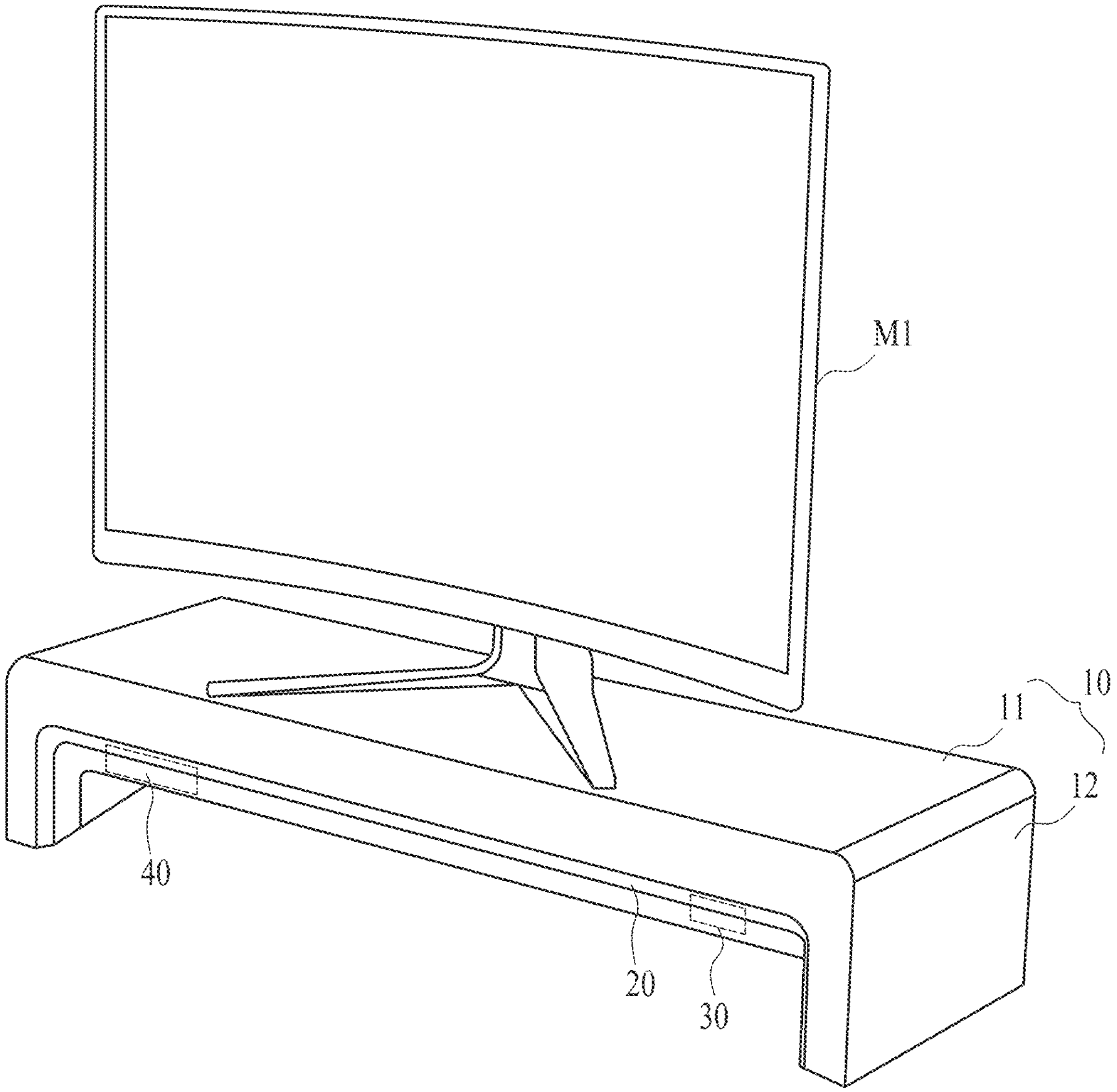
FIG. 1A depicts a configuration diagram of a monitor stand according to one embodiment of the present disclosure.
Figure 1B:
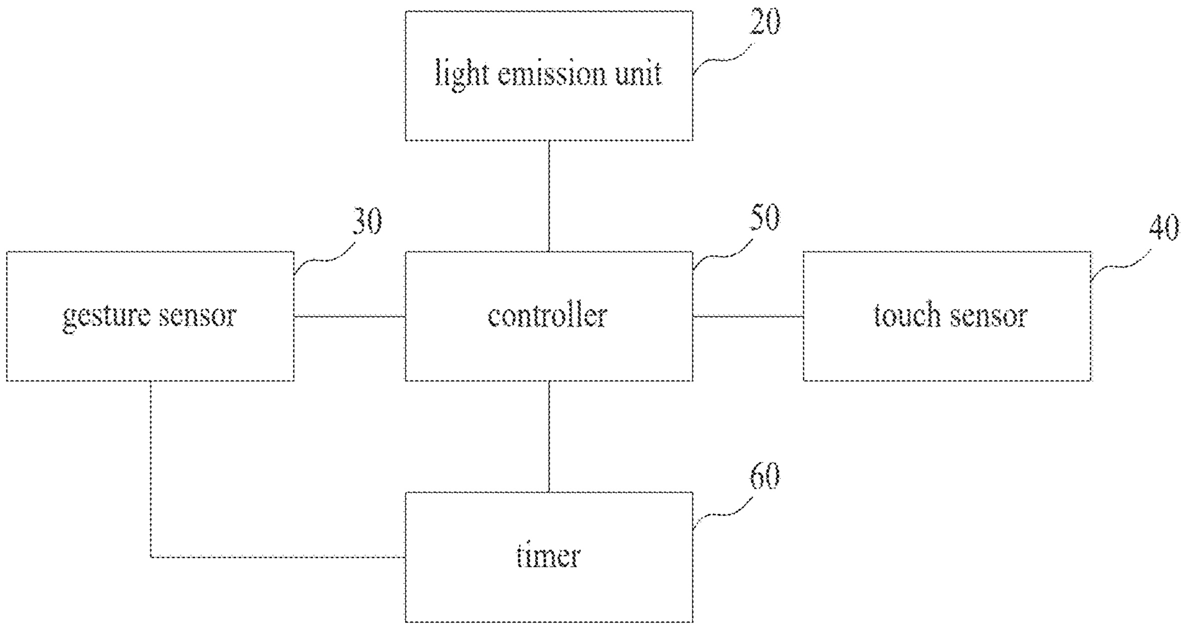
FIG. 1B depicts a block diagram of electronic components of a monitor stand according to one embodiment of the present disclosure.

Please refer to FIG. 1A and FIG. 1B, which depict a configuration diagram of a monitor stand according to one embodiment of the present disclosure and a block diagram of electronic components of a monitor stand according to one embodiment of the present disclosure. As shown in FIG. 1A and FIG. 1B, a monitor stand includes a base 10, a light emission unit 20, a gesture sensor 30, a touch sensor 40, and a controller 50.

The base 10 supports a monitor M1 and has an interior. Specifically, the base 10 includes a plate 11 and two legs 12 connected to the plate 11. The monitor M1 is placed on the plate 11, and the plate 11. The two legs 12 are disposed on the two opposite sides of the plate 11 and extend downwardly from the plate 11. In one embodiment, the plate 11 and the two legs 12 are connected by screws, rivets or snap-fit structures. In another embodiment, the plate 11 and the two legs 12 are integrally formed. The interior of the base 10 accommodates the gesture sensor 30, the touch sensor 40, and the controller 50.

The light emission unit 20 is disposed on the base and is electrically connected to the controller 50. The light emission unit 20 is controlled by the controller 50 to selectively emit light, and the color and the brightness of the light is determined by the controller 50. For example, the light emission unit 20 is a LED, but the light emission unit 20 may be the other type light sources and be not limited thereto.

The gesture sensor 30 is disposed on a first circuit board, and the first circuit board is disposed within interior of the base 10 and is located at the front side of the plate 11 and is adjacent to the leg 12 on one side of the plate 11 (e.g., the right side of the plate 11). For example, the gesture sensor 30 is an infrared (IR) red light sensor, and the first circuit board is a printed circuit board (PCB) or a flexible printed circuit board (FPCB). The gesture sensor 30 is configured to detect a hand gesture and is electrically connected to the controller 50. When a user makes the hand gesture in front of the gesture sensor 30, the gesture sensor 30 detects the hand gesture and generates and transmits a first sensing signal to the controller 50 according to the hand gesture, and the controller 50 controls the light emission unit 20 to be turned on or turned off according to the first sensing signal. When the hand gesture is a rightward hand gesture, the gesture sensor 30 generates and transmits the first sensing signal corresponding to the rightward hand gesture to the controller 50 according to the rightward hand gesture, and the controller 50 controls the light emission unit 20 to be turned on according to the first sensing signal corresponding to the rightward hand gesture. When the hand gesture is a leftward hand gesture, the gesture sensor 30 generates and transmits the first sensing signal corresponding to the leftward hand gesture to the controller 50 according to the leftward hand gesture, and the controller 50 controls the light emission unit 20 to be turned off according to the first sensing signal corresponding to the leftward hand gesture.

The touch sensor 40 is disposed on a second circuit board separate from the first circuit board, and the second circuit board is disposed within interior of the base 10 and is located at the front side of the plate 11 and is adjacent to the leg 12 on the other side of the plate 11 (e.g., the left side of the plate 11). In other words, the second circuit board and the first circuit board are oppositely disposed, and the gesture sensor 30 and the touch sensor 40 are separate from each other and are on the opposite sides of the base 10. For example, the touch sensor is the IR red light sensor or a capacitive touch sensor, and the second circuit board is the PCB or the FPCB. The touch sensor 40 is configured to detect a touch motion and is electrically connected to the controller 50. When the user touches the touch sensor 40, the touch sensor 40 detects the touch motion of the user and generates and transmits a second sensing signal to the controller 50 according to the touch motion of the user, and the controller 50 controls the light emission unit 20 to change the color of the light according to the second sensing signal. For example, when the user makes the rightward hand gesture in front of the gesture sensor 30, the gesture sensor 30 generates and transmits the first sensing signal corresponding to the rightward hand gesture to the controller 50, and the controller 50 controls the light emission unit 20 to be turned on according to the first sensing signal corresponding to the rightward hand gesture, and the light emission unit 20 emits white light. Thereafter, when the user touches at the position of the plate corresponding to the touch sensor 40, the touch sensor 40 generates and transmits the second sensing signal to the controller 50 according to the touch motion of the user, and the controller 50 controls the light emission unit 20 to emit orange light according to the second sensing signal.

Figure 2A:
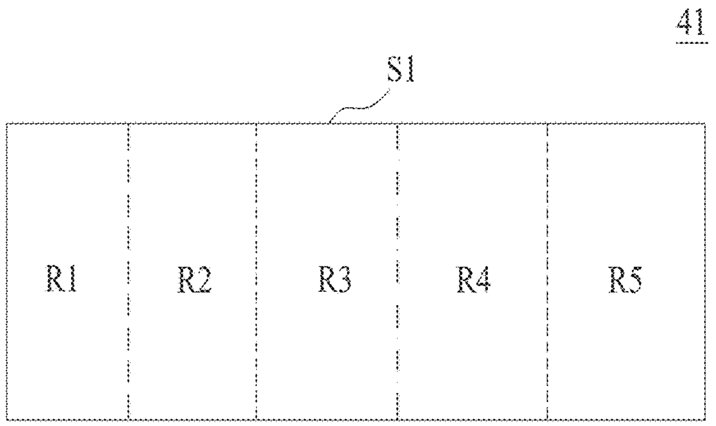
FIG. 2A and FIG. 2B depict a configuration diagram of a touch sensor according to one embodiment of the present disclosure.
Figure 2B:
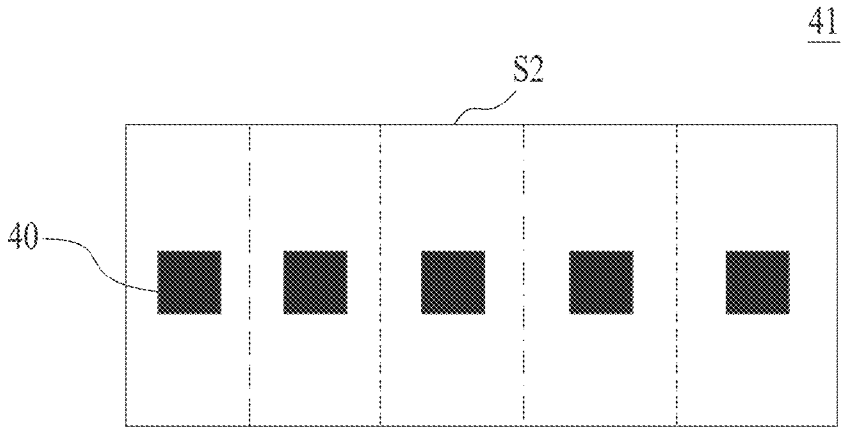

In another embodied aspect, the touch sensor 40 is provided in plural, and the configuration of the plurality of touch sensors 40 would be elaborated as follows. Please further refer to FIG. 2A and FIG. 2B, which depict a configuration diagram of a touch sensor according to one embodiment of the present disclosure. As shown in FIG. 2A and FIG. 2B, the monitor stand further includes a touching plate 41 disposed on the base 10, and the touching plate 41 serves as the second circuit board. The touching plate 41 has a first face S1 and a second surface S2 which are opposite to each other, the first face S1 is close to the surface of the base 10, and the second surface S2 is far away from the surface of the base 10. For example, the number of the touch sensors 40 is five, and the five touch sensors 40 are disposed on the second surface S2. Correspondingly, the first face S1 is divided into five regions, and the five regions are a first region R1, a second region R2, a third region R3, a fourth region R4 and a fifth region R5. Each of the first region R1, the second region R2, the third region R3, the fourth region R4 and the fifth region R5 corresponds to one touch sensor 40.

When the user touches the first region R1, the touch sensor 40 corresponding to the first region R1 generates and transmits a second sensing signal to the controller 50, and the controller 50 controls the light emission unit 20 to emit the white light according to the second sensing signal from the touch sensor 40 corresponding to the first region R1. When the user touches the second region R2, the touch sensor 40 corresponding to the second region R2 generates and transmits the second sensing signal to the controller 50, and the controller 50 controls the light emission unit 20 to emit red light according to the second sensing signal from the touch sensor 40 corresponding to the second region R2. When the user touches the third region R3, the touch sensor 40 corresponding to the third region R3 generates and transmits the second sensing signal to the controller 50, and the controller 50 controls the light emission unit 20 to emit yellow light according to the second sensing signal from the touch sensor 40 corresponding to the third region R3. When the user touches the fourth region R4, the touch sensor 40 corresponding to the fourth region R4 generates and transmits the second sensing signal to the controller 50, and the controller 50 controls the light emission unit 20 to emit green light according to the second sensing signal from the touch sensor 40 corresponding to the fourth region R4. When the user touches the fifth region R5, the touch sensor 40 corresponding to the fifth region R5 generates and transmits the second sensing signal to the controller 50, and the controller 50 controls the light emission unit 20 to emit blue light according to the second sensing signal from the touch sensor 40 corresponding to the fifth region R5. In other words, the touch sensors 40 corresponding to the different regions of the first face S1 generate the different second sensing signals according to touch motions on the different regions of the first face S1, and the different second sensing signals correspond to the different colors of the light.

The controller 50 is disposed within the interior of the base 10. In one embodiment, the controller 50 is disposed on the first circuit board with the gesture sensor 30 and is electrically connected to the touch sensors 40 by conductive wires. In another embodiment, the controller 50 is disposed on the second circuit board with the touch sensors 40 and is electrically connected to the gesture sensor 30 by the conductive wires. For example, the controller is a microcontroller unit (MCU).

In the present embodiment, the monitor stand further includes a timer 60 electrically connected to the gesture sensor 30 and the controller 50. When the user holds the hand under the plate 11, the hand gesture is a holding gesture, the gesture sensor 30 detects the holding gesture and generates and transmits the first sensing signal corresponding to the holding gesture to the controller 50 according to the holding gesture, and the controller 50 controls the light emission unit 20 to be turned on according to the first sensing signal corresponding to the holding gesture. In the present, the controller 50 controls the timer 60 to be activated, and the timer 60 records and transmits the holding time of the holding gesture to the controller 50, and the controller 50 controls the light emission unit 20 to adjust the brightness of the light according to the holding time.

The controller 50 has a time threshold value. The controller 50 controls the light emission unit 20 to increase the brightness of the light as the value of the holding time increases from zero to a time threshold value and controls the light emission unit 20 to decrease the brightness of the light as the value of the holding time increases from the time threshold value to the time point when the user does not keep the holding gesture. In other words, the controller 50 controls the light emission unit 20 to increase the brightness of the light as the value of the holding time increases before the time threshold value and controls the light emission unit 20 to decrease the brightness of the light as the value of the holding time increases after the time threshold value.

In the monitor stand provided by present embodiment, the adjustments of the dimmable illumination in the monitor stand are achieved by the light emission unit, the gesture sensor, the timer and the controller; the seamless color changes are achieved by the light emission unit, the touch sensor, and the controller. When the monitor stand is applied to the situation that the user plays a computer game in a room, the adjustments of the dimmable illumination and the seamless color changes help the user be immersed in the atmosphere of the computer game. The monitor stand can change the brightness of the light according to the different gaming sessions of the computer game, and it is beneficial to set the perfect atmospheres for different gaming sessions of the computer game and to adjust the room temperature. Hence, the monitor stand can elevate the user's gaming setup and improve the user's experience on the computer game.

Figure 3A:
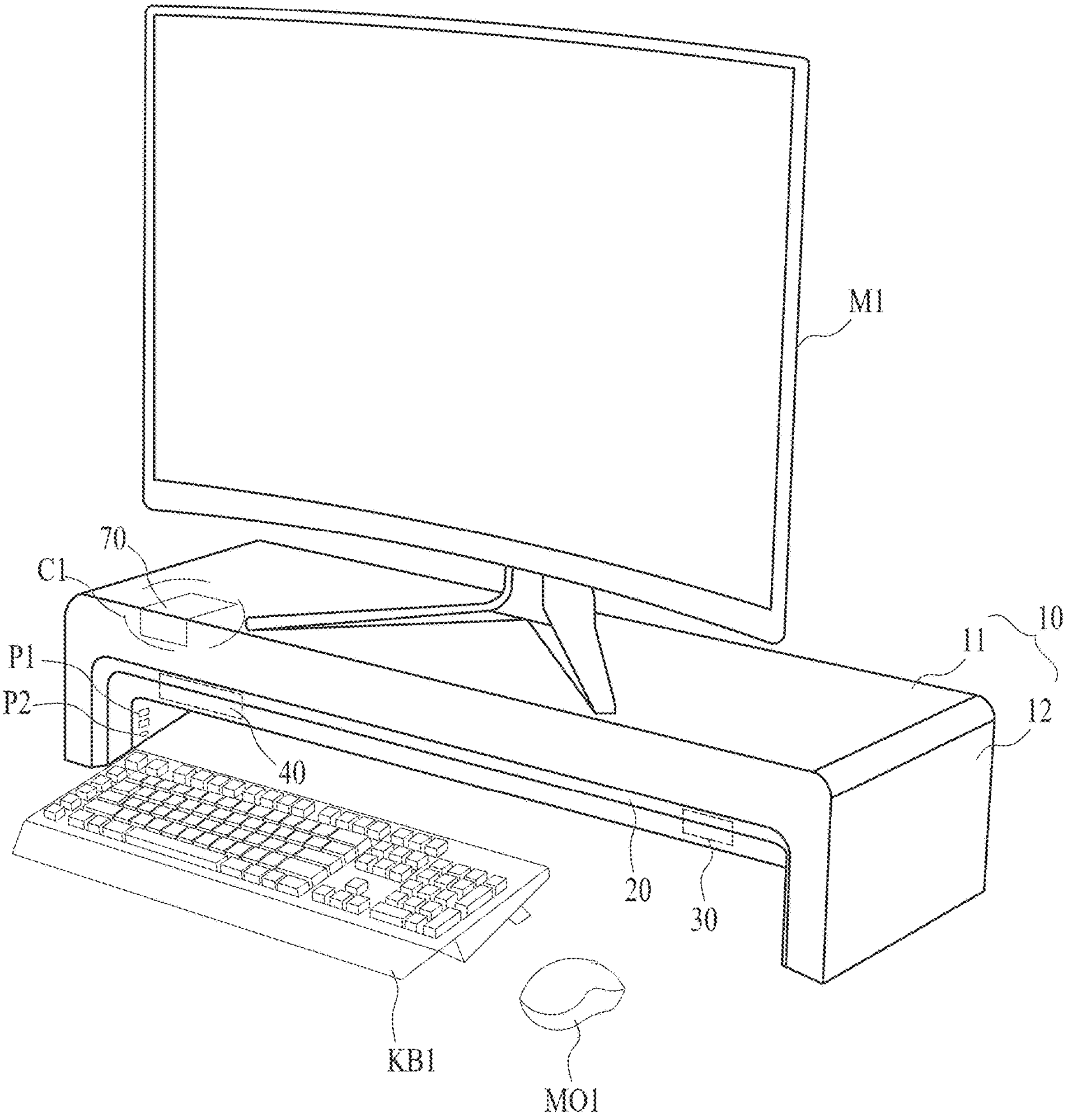
FIG. 3A depicts a front view diagram of a monitor stand according to another embodiment of the present disclosure.
Figure 3B:
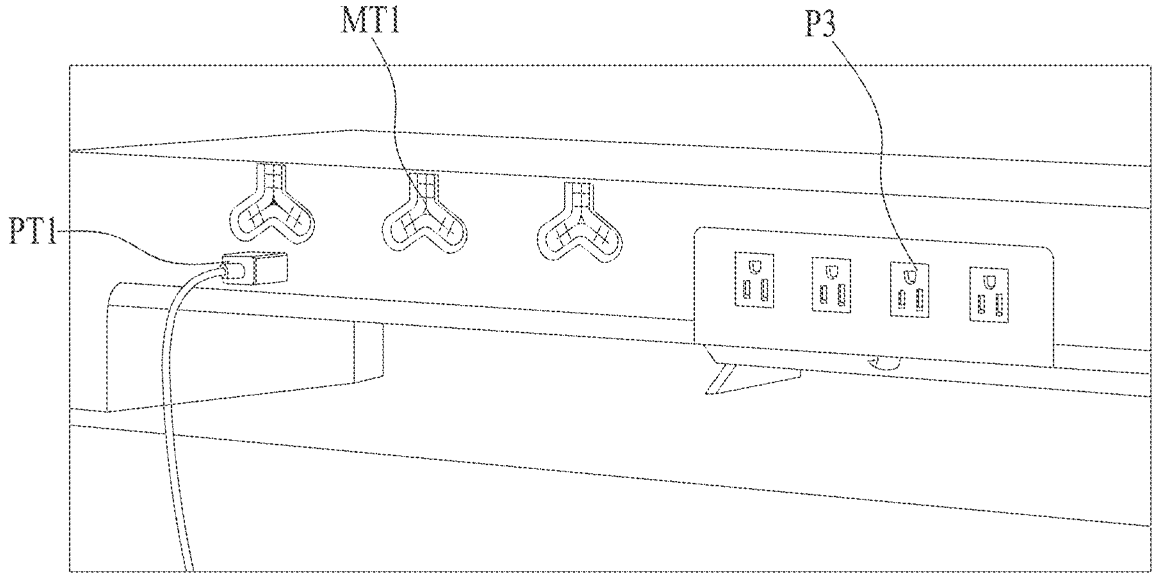
FIG. 3B depicts a back view diagram of a monitor stand according to another embodiment of the present disclosure.

Please refer to FIG. 3A and FIG. 3B, which depict a front view diagram of a monitor stand according to another embodiment of the present disclosure and a back view diagram of a monitor stand according to another embodiment of the present disclosure. As shown in FIG. 3A and FIG. 3B, the monitor stand includes a base 10, a light emission unit 20, a gesture sensor 30, a touch sensor 40, a controller 50, a timer 60, a dismountable wireless charger 70, a multi-directional grommet MT1, a power inlet PT1, and a plurality of ports. The configurations of the base 10, the light emission unit 20, the gesture sensor 30, the touch sensor 40, the controller 50, and the timer 60 in FIG. 3A and FIG. 3B are similar to the configurations of the base 10, the light emission unit 20, the gesture sensor 30, the touch sensor 40, the controller 50, and the timer 60 in FIG. 1A and FIG. 1B, and the similarities between the configurations of FIG. 3A and FIG. 3B and the configurations of FIG. 1A and FIG. 1B would not be not repeated.

The plurality of ports are disposed on the base 10 and include at least one USB socket P1, a thunderbolt socket P2 and at least one power socket P3. The at least one USB socket P1 and the thunderbolt socket P2 are disposed on the inner side wall of the leg 12, and the at least one power socket P3 is disposed at the back side of the plate 11. For example, the number of the USB sockets P1 is two, and the type of each USB socket P1 is USB-A; one of the USB sockets P1 is connected to a keyboard KB1 by a USB cable, and the other of the USB sockets P1 is connected to a mouse MO1 by a USB wireless USB adapter. The thunderbolt socket P2 is convenient to seamlessly charge and to transfer data with a laptop, a computer, or the other electronic devices. The number of the power sockets P3 is four, and the type of each power socket P3 is type B; one of the power sockets P3 is connected to the monitor M1 by a power cable.

The power inlet PT1 is disposed on the base 10; specifically, the power inlet PT1 is disposed at the back side of the plate 11 and is adjacent to the four power sockets P3. The power inlet PT1 is connected to an external power supply by a main power cord for receiving external power and is electrically connected to the USB sockets P1, the thunderbolt socket P2 and the power sockets P3. In other words, the power inlet PT1 is the central hub for receiving electrical power and transfers the electrical power to the USB sockets P1, the thunderbolt socket P2 and the power sockets P3, i.e., all-in-one power control. The all-in-one power control is convenient for powering the user's computer and the user's computer accessories and efficiently organize the USB cables and the charging cables of the monitor stand, thereby simplifying and decluttering the user's computer desk.

In the present embodiment, the base 10 includes an accommodation groove C1, and the accommodation groove Cl located at the front side of the base 10 and accommodates the dismountable wireless charger 70. The dismountable wireless charger 70 can be detached from the accommodation groove C1, be foldable and be switched between a folded state and an unfolded state. In other words, the dismountable wireless charger 70 is flexible and lies in the folded state or the unfolded state according to the use of the user.

The configuration of the dismountable wireless charger 70 would be elaborated as follows. Please refer to FIG. 4A to FIG. 4C, which depict a schematic diagram of a dismountable wireless charger in a folded state according to another embodiment of the present disclosure, a schematic diagram of a dismountable wireless charger dismounted from an accommodation groove according to another embodiment of the present disclosure and a schematic diagram of a dismountable wireless charger in an unfolded state according to another embodiment of the present disclosure.

Figure 4A:
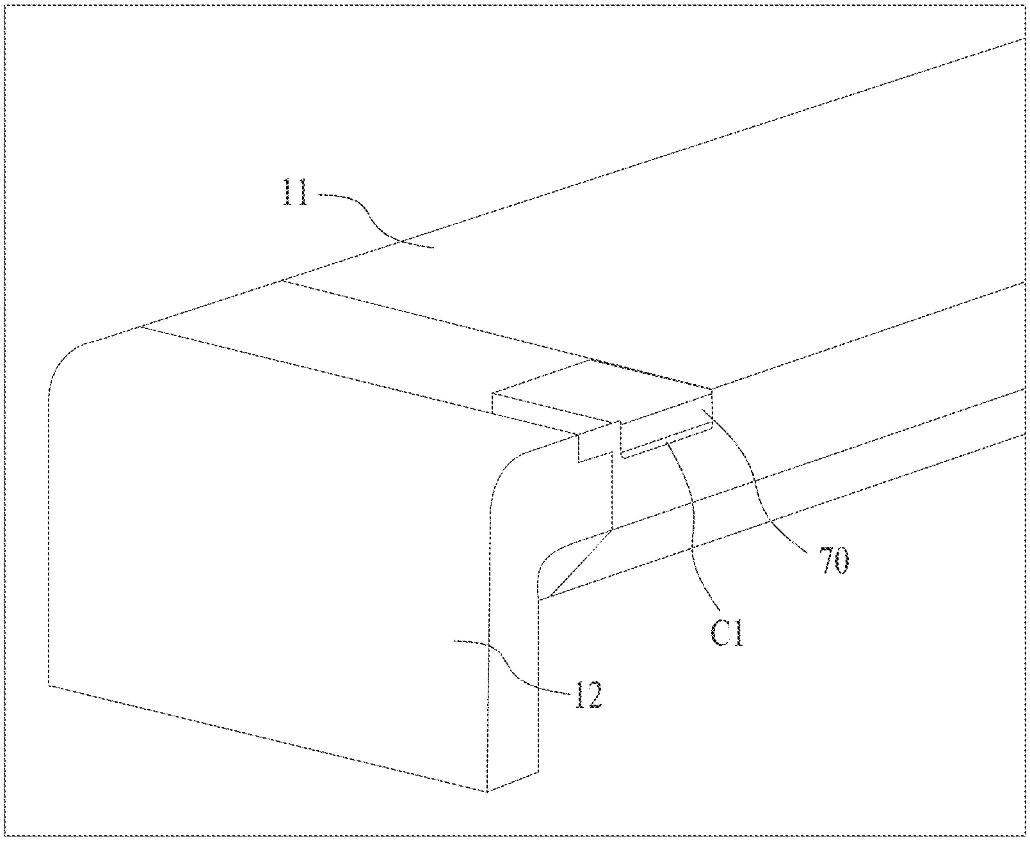
FIG. 4A depicts a schematic diagram of a dismountable wireless charger in a folded state according to another embodiment of the present disclosure.

As shown in FIG. 4A, the dismountable wireless charger 70 lies in the folded state and is located on the accommodation groove C1, and at least one part of the dismountable wireless charger 70 may be lifted up for powering a mobile phone such as a smartphone. Specifically, the dismountable wireless charger 70 may be divided into an upper part, a middle part and a lower part. When the user lifts up the upper part and the middle part of the dismountable wireless charger 70, the lower part is still located on the accommodation groove C1, the middle part is inclined with respect to the lower part, the upper part is inclined with respect to the middle part, and the user may place the smartphone on the middle part.

Figure 4B:
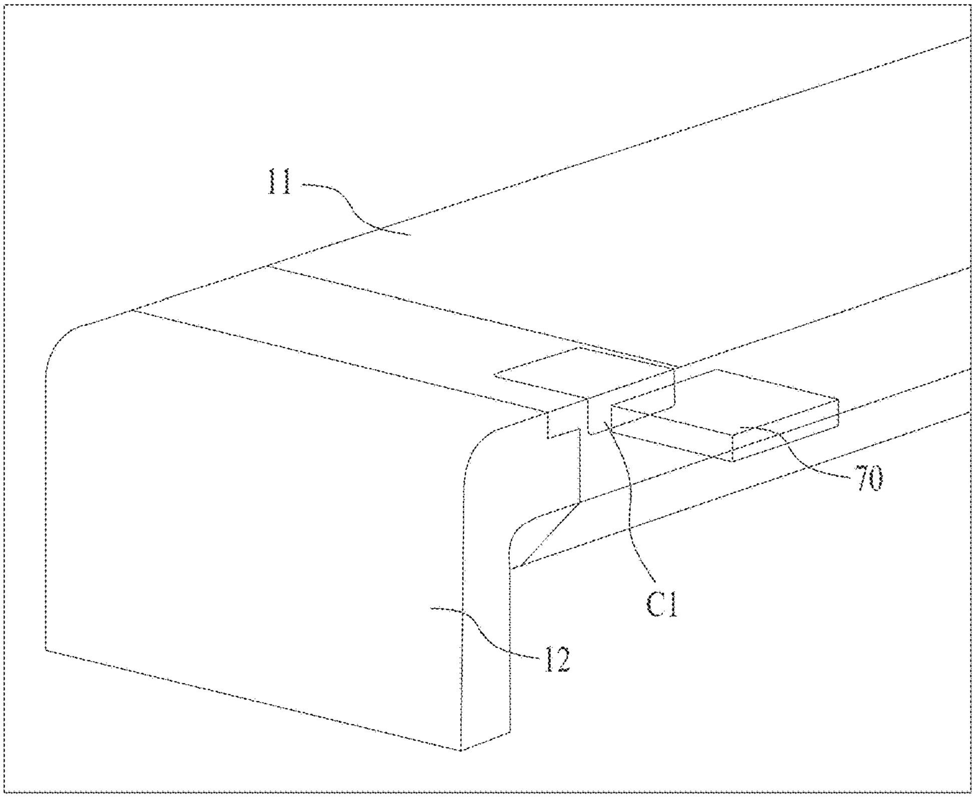
FIG. 4B depicts a schematic diagram of a dismountable wireless charger dismounted from an accommodation groove according to another embodiment of the present disclosure.
Figure 5:
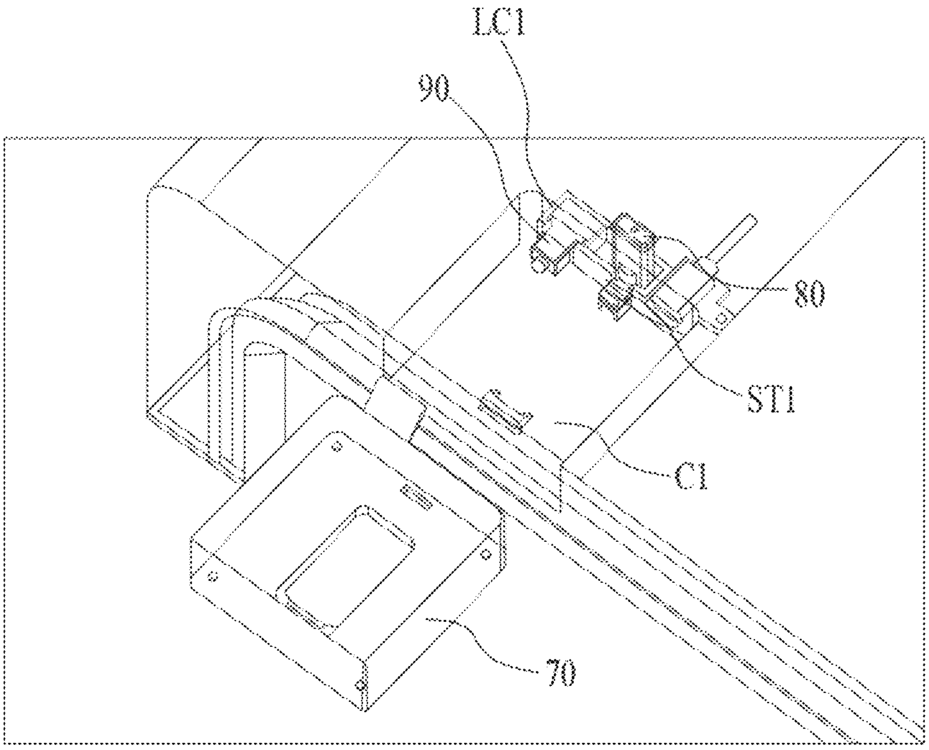
FIG. 5 depicts a configuration diagram of an accommodation groove and a limiting groove according to another embodiment of the present disclosure.

As shown in FIG. 4B, the dismountable wireless charger 70 slides out of the accommodation groove C1 and still remains in the folded state. The sliding out mechanism would be explained in detail as follows. Please further refer to FIG. 5, which is a configuration diagram of an accommodation groove and a limiting groove according to another embodiment of the present disclosure. As shown in FIG. 5, the monitor stand further includes a limiting groove LC1, a button 80, and a linkage component 90.

The limiting groove LC1 is disposed within the interior of the base 10 and is adjacent to the accommodation groove C1. The limiting groove LC1 accommodates the button 80 and the linkage component 90 and has a shutter ST1. When the shutter ST1 is closed, one side surface of the shutter ST1 contacts the linkage component 90, and one end of the linkage component 90 resists the shutter ST1. In other words, the shutter ST1 limits the movement of the linkage component 90. In addition, there is a USB-C port in the limiting groove LC1 which can be connected to the dismountable wireless charger 70 for charging the dismountable wireless charger 70.

The button 80 is disposed in the limiting groove LC1. When the button 80 is not pressed, the button 80 protrudes from the surface of the base 10. When the button 80 is pressed, the button 80 downwardly moves and the contacts the bottom of the limiting groove LC1. In other words, the button 80 moves between the surface of the base 10 and the bottom of the limiting groove LC1.

The linkage component 90 is disposed in the limiting groove LC1 and has a spring. The spring has elastic force to drive the linkage component 90 to move. When the button 80 is not pressed and protrudes from the surface of the base 10, the shutter ST1 is closed, one side surface of the shutter ST1 contacts the linkage component 90, the spring is compressed, and one end of the linkage component 90 resists the shutter ST1. When the button 80 is pressed to move to the bottom of the limiting groove LC1, the shutter ST1 is open, and the spring is released. Afterwards, the elastic force of the spring drives the linkage component 90 to move toward the dismountable wireless charger 70 on the accommodation groove C1, the linkage component 90 pushes the dismountable wireless charger 70 and the dismountable wireless charger 70 slides out of the accommodation groove C1. Hence, the dismountable wireless charger 70 is portable and is suitable for indoor use and outdoor use, and it is convenient for the user to effortlessly carry the dismountable wireless charger 70 for charging a plurality of external electronic devices such as a smartwatch and earbuds.

Figure 4C:
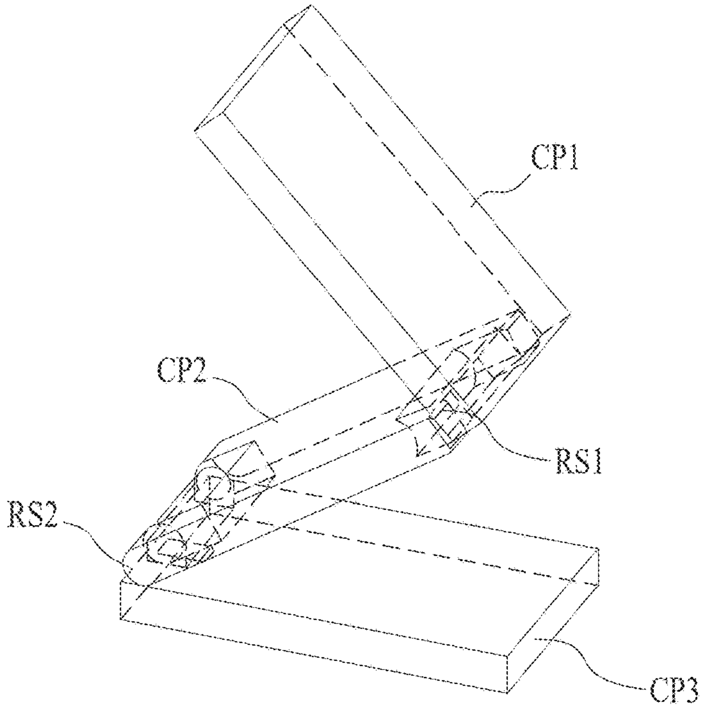
FIG. 4C depicts a schematic diagram of a dismountable wireless charger in an unfolded state according to another embodiment of the present disclosure.

As shown in FIG. 4C, the dismountable wireless charger 70 lies in the unfolded state and includes a first rotation shaft RS1, a first charging pad CP1, a second charging pad CP2, a second rotation shaft RS2, and a third charging pad CP3. The first charging pad CP1 and the second charging pad CP2 are rotatably connected to the first rotation shaft RS1, and the first charging pad CP1 and the second charging pad CP2 are configured to be folded or unfolded in relation to each other around the first rotation shaft RS1. The second charging pad CP2 and the third charging pad CP3 are rotatably connected to the second rotation shaft RS2, and the second charging pad CP2 and the third charging pad CP3 are configured to be folded or unfolded in relation to each other around the second rotation shaft RS2.

When the dismountable wireless charger 70 lies in the folded state, the first charging pad CP1 and the second charging pad CP2 are folded in relation to each other around the first rotation shaft RS1, and the bottom surface of the first charging pad CP1 contacts the top surface of the second charging pad CP2; the second charging pad CP2 and the third charging pad CP3 are folded in relation to each other around the second rotation shaft RS2, and the bottom surface of the second charging pad CP2 contacts the top surface of the third charging pad CP3.

When the dismountable wireless charger 70 lies in the unfolded state, the first charging pad CP1 rotates around the first rotation shaft RS1 with respect to the second charging pad CP2, and the bottom surface of the first charging pad CP1 is inclined with respect to the top surface of the second charging pad CP2; the second charging pad CP2 rotates around the second rotation shaft RS2 with respect to the third charging pad CP3, and the bottom surface of the second charging pad CP2 is inclined with respect to the top surface of the third charging pad CP3. In other words, when the dismountable wireless charger 70 lies in the unfolded state, the first charging pad CP1 and the second charging pad CP2 are unfolded in relation to each other around the first rotation shaft RS1, and the second charging pad CP2 and the third charging pad CP3 are unfolded in relation to each other around the second rotation shaft RS2. Thus, the dismountable wireless charger 70 can charge the smartphone, the smartwatch and the earbuds simultaneously, and the first charging pad CP1, the second charging pad CP2 and the third charging pad CP3 are adjustable and can let the user lift the mobile phone to a suitable angle for easy access.

Figure 6:
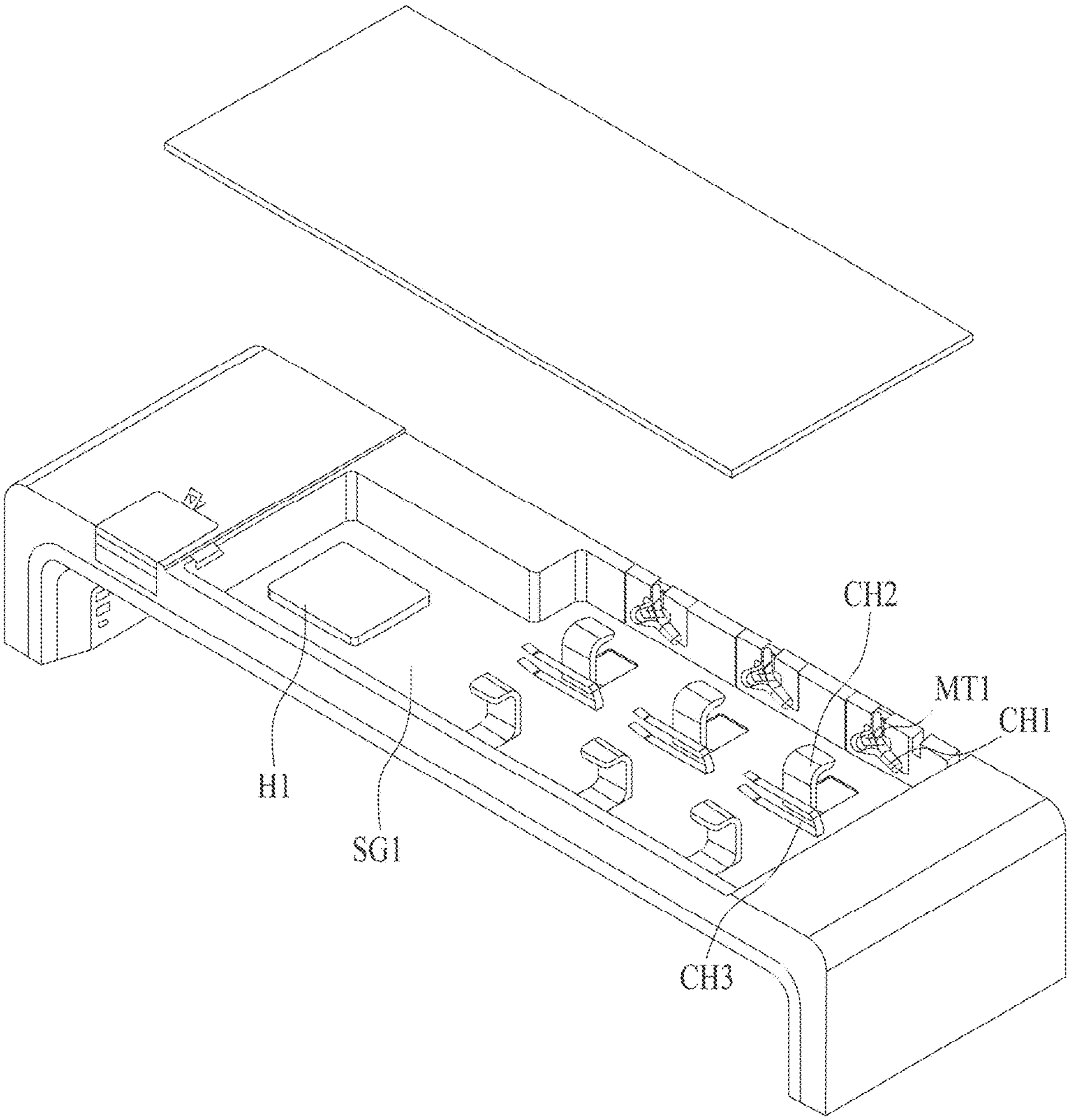
FIG. 6 depicts an inner configuration diagram of a storage groove according to another embodiment of the present disclosure.

Please refer to FIG. 6, which is an inner configuration diagram of a storage groove according to another embodiment of the present disclosure. As shown in FIG. 6, the monitor stand further includes a multi-directional grommet MT1 and a plurality of cable-holding components.

The multi-directional grommet MT1 is disposed on the base 10; specifically, the multi-directional grommet MT1 is disposed on the back side of the plate 11. The multi-directional grommet MT1 has an opening which allows at least one cable to enter the interior of the base 10. In the present embodiment, the multi-directional grommet MT1 is provided in plural.

The plurality of cable-holding components are disposed within the interior of the base 1 and secure at least one cable. For example, the plurality of cable-holding components include cable winders CH1 and cable tiles CH2. One multi-directional grommet MT1 corresponds to two cable winders CH1 and one cable tile CH2. One of the two cable winders CH1 face the multi-directional grommet MT1, and the other cable winder CH1 faces away from the multi-directional grommet MT1. The cable tile CH2 is disposed between the two cable winders CH1, and the two cable winders CH1 are located on the two opposite sides of the cable tile CH2.

For example, when one cable penetrates the multi-directional grommet MT1 and enters interior of the base 10, the cable passes through the cable tile CH2 and then is fastened by the two cable winders CH2. Afterwards, the fastened cable passes through the cable tiles CH2 and penetrates the multi-directional grommet MT1 Hence, the cable is secured.

According to the above description, the multi-directional grommets MT1 and the plurality of cable-holding components collaboratively secure the cables, and thus, the chaos of the tangled cables are tamed, and the organized cables are maintained.

The monitor stand further includes a storage groove SG1 disposed on the interior. The storage groove SG1 is adjacent to the space where the plurality of cable-holding components are located and can store an external storage device H1 such as a portable solid-state drive (SSD) and a hard disk. In addition, there is an additional USB port in the storage groove SG1, and the portable SSD or the hard disk can be connected to the additional USB port for data transfer, thereby ensuring the essential data in the portable SSD or the hard disk are available.

In the monitor stand provided by present embodiment, the dismountable wireless charger is detachable from the base, and it is convenient for the user to carry and to charge the external electronic devices at the same time. The dismountable wireless charger is foldable, and it is beneficial for the user to charge various electronic devices such as the smart phone and the earbuds synchronously and to lift the smart to a comfortable angle for easy access and message checking. In addition, by the multi-directional grommet and the plurality of cable-holding components, the cables are secured and organized, thereby keeping the user's computer desk clean.

Figure 7A:
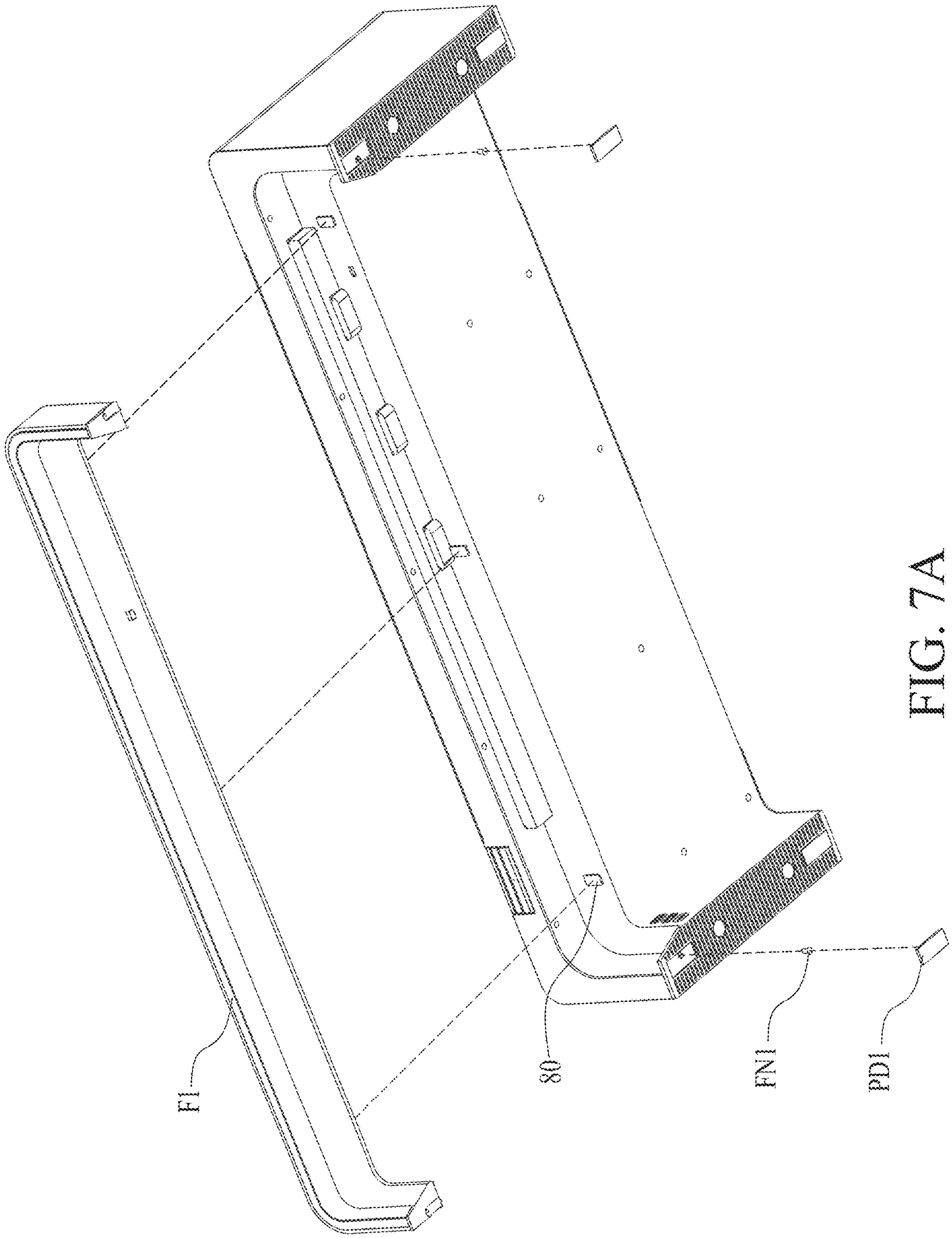
FIG. 7A depicts a configuration diagram of a monitor stand according to yet another embodiment of the present disclosure.
Figure 7B:
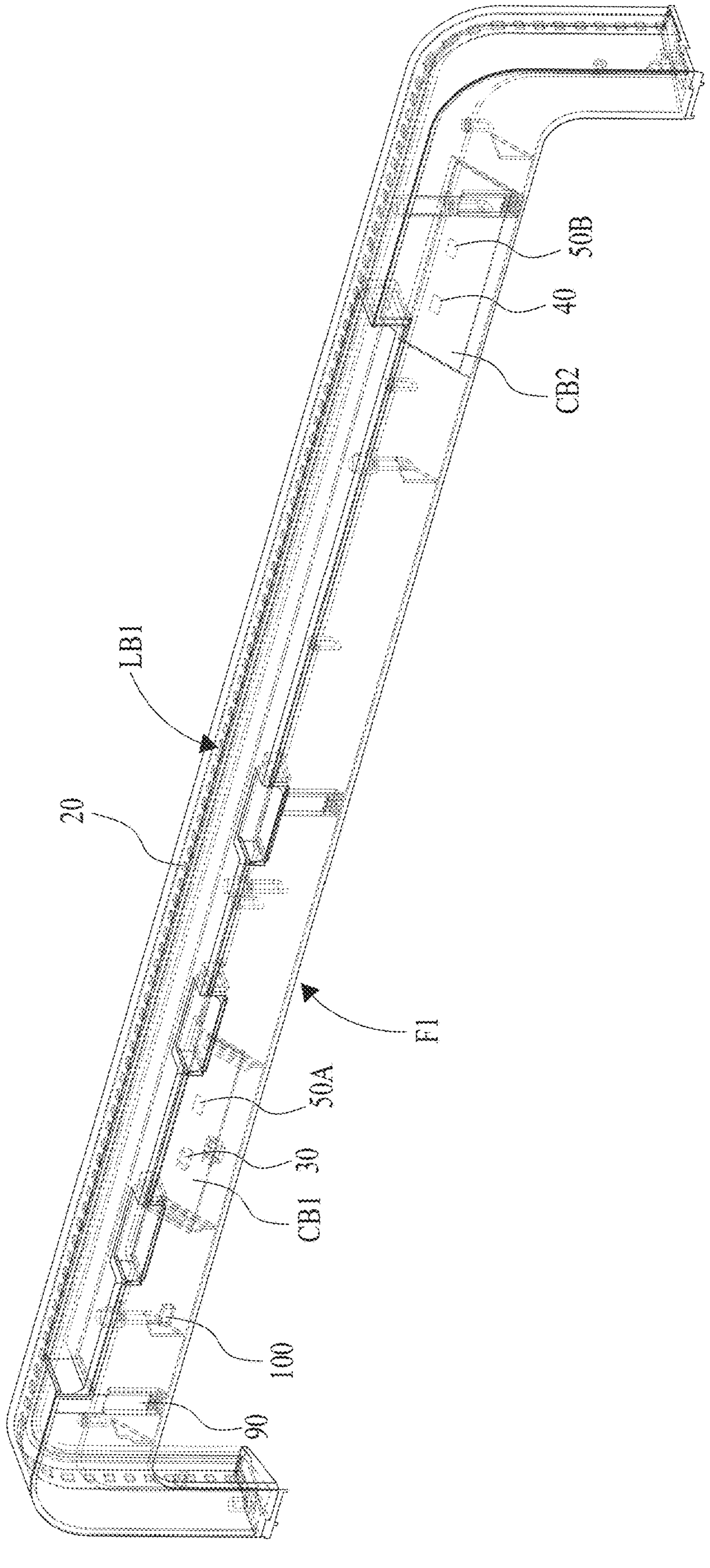
FIG. 7B depicts a configuration diagram of an auxiliary frame according to yet another embodiment of the present disclosure.

Please refer to FIG. 7A and FIG. 7B, which depict a configuration diagram of a monitor stand according to yet another embodiment of the present disclosure and a configuration diagram of an auxiliary frame according to yet another embodiment of the present disclosure. As shown in FIG. 7A and FIG. 7B, the monitor stand includes the base 10, the light emission unit 20, the gesture sensor 30, the touch sensor 40, the controllers 50A and 50B, a plurality of first magnets 80, a plurality of second magnets 90, the first circuit board CB1, the second circuit board CB2, at least one connector 100, a plurality of pads PD1 and a plurality of fasteners FN1. The configurations of the base 10, the light emission unit 20, the gesture sensor 30, the touch sensor 40 and the controllers 50A and 50B in FIG. 7A and FIG. 7B are similar to the configurations of the base 10, the light emission unit 20, the gesture sensor 30, the touch sensor 40, the controller 50 in FIG. 1A and FIG. 1B, and the similarities between the configurations of FIG. 7A and FIG. 7B and the configurations of FIG. 1A and FIG. 1B would not be not repeated.

The base 10 includes an auxiliary frame F1. The auxiliary frame F1 is located at the front side of the plate 11 and is adjacent to the two legs 12; in other words, the auxiliary frame F1 is located at the front side of the base. Specifically, the one end of the auxiliary frame F1 bends inward to be parallel to the leg 12 on the right side of the plate 11, and the other end of the auxiliary frame F1 bends inward to be parallel to the leg 12 on the left side of the plate 11, i.e., the auxiliary frame F1 is a curved frame. The auxiliary frame F1 has recesses, and the plate 11 has snaps or bosses corresponding to the recesses; in other words, the auxiliary frame F1 is detachable and can engage with the plate 11.

The light emission unit 20 is provided in plural, the plurality of the light emission units 20 constitutes a light bar LB1. The light bar LB1 is disposed on the auxiliary frame F1 and extends along the contour of the auxiliary frame F1. Furthermore, the light bar LB1 is located at the front side of the auxiliary frame F1, one end of the light bar LB1 bends inward to be parallel to the one end of the auxiliary frame F1, and the other end of light bar LB1 bends inward to be parallel to the other end of the auxiliary frame F1. In other words, the light bar LB1 is flexible. Because the plurality of the light emission units 20 can exhibits the different colors, the light bar LB1 can emit the light with the different colors. The light bar LB1, the gesture sensor 30 and the touch sensor 40 are separate from one another, and in other words, the light bar LB1, the gesture sensor 30 and the touch sensor 40 are independently disposed.

The first circuit board CB1 is disposed between the interior of the base 10 and the auxiliary frame F1. Specifically, the first circuit board CB1 is adjacent to the one end of the auxiliary frame F1, one part of the first circuit board CB1 is located on the interior of the base 10, and the other part of the first circuit board CB1 is located on the auxiliary frame F1. The gesture sensor 30 and the controller 50A are disposed on the first circuit board CB1, and the controller 50A is electrically connected to the gesture sensor 30 and the light bar LB1. The controller 50A controls the light bar LB1 to emit the light according to the first sensing signal from the gesture sensor 30.

The second circuit board CB2 is disposed between the interior of the base 10 and the auxiliary frame F1. Specifically, the second circuit board CB2 is adjacent to the other end of the auxiliary frame F1, one part of the second circuit board CB2 is located on the interior of the base 10, and the other part of the second circuit board CB2 is located on the auxiliary frame F1. The touch sensor 40 and the controller 50B are disposed on the second circuit board CB2, and the controller 50B is electrically connected to the touch sensor 40 and the light bar LB1. The controller 50B controls the light bar LB1 to change the color of the light according to the second sensing signal from the touch sensor 40.

In the present embodiment, the controller 50A on the first circuit board CB1 and the controller 50B on the second circuit board CB2 are separate and respectively correspond to the gesture sensor 30 and the touch sensor 40. The controller 50A receives the first sensing signal from the gesture sensor 30, and the controller 50B receives the second sensing signal from the touch sensor 40. The light bar LB1 is controlled by the controller 50A and the controller 50B.

The at least one connector 100 is disposed on the auxiliary frame F1. In one embodiment, the number of the at least one connector 100 is one, and the first circuit board CB1 and the second circuit board CB2 are electrically connected to the light bar LB1 by the connector 100. One end of the connector 100 is electrically connected to the light bar LB1, and the other end of the connector 100 is electrically connected to the first circuit board CB1 and the second circuit board CB2. In the other embodiment, the number of the at least one connector 100 is two, and the first circuit board CB1 and the second circuit board CB2 are electrically connected to the light bar LB1 by the two connectors 100. One of the two connectors 100 is electrically connected to the first circuit board CB1 and the light bar LB1, and the other connector 100 is electrically connected to the second circuit board CB2 and the light bar LB1.

The plurality of first magnets 80 are located at the front side of the plate 11, i.e., the plurality of first magnets 80 are disposed at the front side of the base 10. The plurality of second magnets 90 are disposed on the auxiliary frame F1. Specifically, the plurality of second magnets 90 are located at the back side of the auxiliary frame F1 to correspond to the plurality of first magnets 80. The number of the plurality of second magnets 90 is the same as the number of the plurality of first magnets 80. The plurality of second magnets 90 attract the plurality of first magnets 80 to fix the auxiliary frame F1 on the front side of the base 10.

The plurality of pads PD1 are disposed on the bottoms of the two legs 12 and are fastened to the two legs 12 by the plurality of fasteners FN1. The plurality of pads PD1 would prevent the base 10 from slipping.

In the monitor stand provided by present embodiment, the gesture sensor and the touch sensor are disposed on the two separate circuit board, and the controller corresponding to the gesture sensor and the controller corresponding to the touch sensor are independent from each other. The gesture sensor would operate without the interruption of the touch sensor. In addition, by the plurality of first magnets and the plurality of second magnets, the auxiliary frame can be fixed.

In view of the above description, the dimmable illumination in the monitor stand is achieved by the light emission unit, the gesture sensor and the controller, and the seamless color changes are achieved by the light emission unit, the touch sensor, and the controller. When the monitor stand is applied to the situation that a user plays a computer game, the user makes a hand gesture in front of the gesture sensor, and the light emission unit emits the light after the gesture sensor detects the hand gesture of the user. Afterwards, the user touches the monitor stand, and the color of the light changes to match the user's gaming mood after the touch sensor detects the touch motion of the user. Hence, the monitor stand has a good influence on the user's experience on the computer games.

What is claimed is:

1. A monitor stand comprising:

a base supporting a monitor and having an interior;

a light emission unit disposed on the base and selectively emitting light;

a gesture sensor disposed within the interior of the base and configured to detect a hand gesture, wherein the gesture sensor generates a first sensing signal according to the hand gesture;

a touch sensor disposed within the interior of the base and configured to detect a touch motion, wherein the touch sensor generates a second sensing signal according to the touch motion; and a controller disposed within the interior of the base and electrically connected to the light emission unit, the gesture sensor and the touch sensor, wherein the controller controls the light emission unit to be turned on or turned off according to the first sensing signal and controls the light emission unit to change a color of the light according to the second sensing signal.

2. The monitor stand according to claim 1, wherein the gesture sensor and the touch sensor are separate from each other and are on opposite sides of the base.

3. The monitor stand according to claim 1, wherein the gesture sensor and the touch sensor are infrared red light sensors.

4. The monitor stand according to claim 1, wherein the controller controls the light emission unit to be turned on according to the first sensing signal corresponding to a rightward hand gesture when the hand gesture is the rightward hand gesture, and the controller controls the light emission unit to be turned off according to the first sensing signal corresponding to a leftward hand gesture when the hand gesture is the leftward hand gesture.

5. The monitor stand according to claim 1, further comprising a timer electrically connected to the gesture sensor and the controller, and when the hand gesture is a holding gesture, the controller controls the light emission unit to be turned on according to the first sensing signal corresponding to the holding gesture, the timer records and transmits holding time of the holding gesture to the controller, and the controller controls the light emission unit to adjust brightness of the light according to the holding time.

6. The monitor stand according to claim 5, wherein the controller has a time threshold value; the controller controls the light emission unit to increase the brightness of the light as a value of the holding time increases before the time threshold value and controls the light emission unit to decrease the brightness of the light as the value of the holding time increases after the time threshold value.

7. The monitor stand according to claim 1, wherein the touch sensor is provided in plural, and the monitor stand further comprising:

a touching plate disposed on the base and having a first surface close to a surface of the base and a second surface far away from the surface of the base, wherein the plurality of the touch sensors are disposed on the second surface and generate the plurality of the second sensing signals according to the different touch motions, and the plurality of the second sensing signals correspond to the different colors of the light.

8. The monitor stand according to claim 1, further comprising:

a multi-directional grommet disposed on the base and allowing at least one cable to enter the interior of the base; and a plurality of cable-holding components disposed within the interior of the base and securing the at least one cable.

9. The monitor stand according to claim 1, further comprising:

a power inlet disposed on the base and receiving external power;

a plurality of ports disposed on the base and electrically connected to the power inlet, wherein the plurality of ports comprise at least one USB socket, a thunderbolt socket and at least one power socket; and a storage groove disposed on the interior and storing an external storage device.

10. The monitor stand according to claim 1, wherein the base comprises an auxiliary frame located at one side of the base; the light emission unit is provided in plural, and the plurality of the light emission unit constitutes a light bar disposed on the auxiliary frame; the monitor stand further comprising:

a first circuit board disposed between the interior of the base and the auxiliary frame, wherein the gesture sensor is disposed on the first circuit board;

a second circuit board disposed between the interior of the base and the auxiliary frame, wherein the touch sensor is disposed on the second circuit board;

a plurality of first magnets disposed at the one side of the base;

a plurality of second magnets disposed on the auxiliary frame and corresponding to the plurality of first magnets; and at least one connector disposed on the auxiliary frame, wherein the first circuit board and the second circuit board are electrically connected to the light bar by the at least one connector.

11. A monitor stand comprising:

a base supporting a monitor and having an interior, wherein the base comprises an accommodation groove;

a light emission unit disposed on the base and selectively emitting light;

a gesture sensor disposed within the interior of the base and configured to detect a hand gesture, wherein the gesture sensor generates a first sensing signal according to the hand gesture;

a touch sensor disposed within the interior of the base and configured to detect a touch motion, wherein the touch sensor generates a second sensing signal according to the touch motion; and a controller disposed within the interior of the base and electrically connected to the light emission unit, the gesture sensor and the touch sensor, wherein the controller controls the light emission unit to be turned on or turned off according to the first sensing signal and controls the light emission unit to change a color of the light according to the second sensing signal;

a dismountable wireless charger being foldable, switched between a folded state and an unfolded state and configured to charge a plurality of external electronic devices, wherein the accommodation groove accommodates the dismountable wireless charger.

12. The monitor stand according to claim 11, wherein the dismountable wireless charger comprising:

a first rotation shaft;

a first charging pad rotatably connected to the first rotation shaft;

a second charging pad rotatably connected to the first rotation shaft, wherein the first charging pad and the second charging pad are configured to be folded or unfolded in relation to each other around the first rotation shaft;

a second rotation shaft rotatably connected to the second charging pad; and a third charging pad rotatably connected to the second rotation shaft, wherein the second charging pad and the third charging pad are configured to be folded or unfolded in relation to each other around the second rotation shaft.

13. The monitor stand according to claim 11, further comprising:

a limiting groove adjacent to the accommodation groove and having a shutter;

a button disposed in the limiting groove and moving between a surface of the base and a bottom of the limiting groove; and a linkage component disposed in the limiting groove, wherein one end of the linkage component resists the shutter, and the shutter limits a movement of the linkage component; when the button is pressed to move to the bottom of the limiting groove, the shutter is open, and the linkage component pushes the dismountable wireless charger.

14. The monitor stand according to claim 11, wherein the gesture sensor and the touch sensor are separate from each other and are on opposite sides of the base.

15. The monitor stand according to claim 11, wherein the gesture sensor and the touch sensor are infrared red light sensors.

16. The monitor stand according to claim 11, wherein the controller controls the light emission unit to be turned on according to the first sensing signal corresponding to a rightward hand gesture when the hand gesture is the rightward hand gesture, and the controller controls the light emission unit to be turned off according to the first sensing signal corresponding to a leftward hand gesture when the hand gesture is the leftward hand gesture.

17. The monitor stand according to claim 11, further comprising a timer electrically connected to the gesture sensor and the controller, and when the hand gesture is a holding gesture, the controller controls the light emission unit to be turned on according to the first sensing signal corresponding to the holding gesture, the timer records and transmits holding time of the holding gesture to the controller, and the controller controls the light emission unit to adjust brightness of the light according to the holding time.

18. The monitor stand according to claim 17, wherein the controller has a time threshold value; the controller controls the light emission unit to increase the brightness of the light as a value of the holding time increases before the time threshold value and controls the light emission unit to decrease the brightness of the light as the value of the holding time increases after the time threshold value.

19. The monitor stand according to claim 11, wherein the touch sensor is provided in plural, and the monitor stand further comprising:

a touching plate disposed on the base and having a first surface close to a surface of the base and a second surface far away from the surface of the base, wherein the plurality of the touch sensors are disposed on the second surface and generate the plurality of the second sensing signals according to the different touch motions, and the plurality of the second sensing signals correspond to the different colors of the light.

20. The monitor stand according to claim 11, further comprising:

a multi-directional grommet disposed on the base and allowing at least one cable to enter the interior of the base; and a plurality of cable-holding components disposed within the interior of the base and securing the at least one cable.

21. The monitor stand according to claim 11, further comprising:

a power inlet disposed on the base and receiving external power;

a plurality of ports disposed on the base and electrically connected to the power inlet, wherein the plurality of ports comprise at least one USB socket, a thunderbolt socket and at least one power socket;

a storage groove disposed on the interior and storing an external storage device.

22. The monitor stand according to claim 11, wherein the base comprises an auxiliary frame located at one side of the base; the light emission unit is provided in plural, and the plurality of the light emission unit constitutes a light bar disposed on the auxiliary frame; the monitor stand further comprising:

a first circuit board disposed between the interior of the base and the auxiliary frame, wherein the gesture sensor is disposed on the first circuit board;

a second circuit board disposed between the interior of the base and the auxiliary frame, wherein the touch sensor is disposed on the second circuit board;

a plurality of first magnets disposed at the one side of the base;

a plurality of second magnets disposed on the auxiliary frame and corresponding to the plurality of first magnets; and at least one connector disposed on the auxiliary frame, wherein the first circuit board and the second circuit board are electrically connected to the light bar by the at least one connector.

* * * * *